United States Patent
Johll, Jr. et al.

(10) Patent No.: US 6,520,545 B2
(45) Date of Patent: Feb. 18, 2003

(54) FLUID CONNECTION ADAPTER ASSEMBLY

(75) Inventors: William P. Johll, Jr., Dubuque, IA (US); Charles T. Nachtman, Dubuque, IA (US); Helmut R. H. Gideon, Dubuque, IA (US); Timothy T. Dunwoody, Dubuque, IA (US); Jamie C. Carr, Dubuque, IA (US); Thomas Scholz, Mt. Sinai, NY (US)

(73) Assignee: Sartorius AG, Goettingen (DE)

( * ) Notice: Subject to any disclaimer, the term of this patent is extended or adjusted under 35 U.S.C. 154(b) by 73 days.

(21) Appl. No.: 09/733,588

(22) Filed: Dec. 8, 2000

(65) Prior Publication Data

US 2002/0070546 A1 Jun. 13, 2002

(51) Int. Cl.[7] ................................................ F16L 39/00
(52) U.S. Cl. .............................. 285/124.1; 285/124.5; 285/124.4; 285/124.3; 285/124.2; 285/216
(58) Field of Search ........................... 285/124.1–124.5, 285/216, FOR 118; 411/33, 34, 37, 38

(56) References Cited

U.S. PATENT DOCUMENTS

| | | | | | |
|---|---|---|---|---|---|
| 408,364 | A | * | 8/1889 | Traut | 215/359 |
| 3,093,220 | A | * | 6/1963 | Modrey | 403/408.1 |
| 3,356,245 | A | * | 12/1967 | Little | 220/4.24 |
| 3,640,552 | A | * | 2/1972 | Demler, Sr. et al. | 285/110 |
| 4,089,549 | A | * | 5/1978 | Vyse et al. | 285/137 R |
| 4,734,001 | A | * | 3/1988 | Bennett | 411/119 |
| 5,071,172 | A | * | 12/1991 | Gross | 285/137.1 |
| 5,925,240 | A | | 7/1999 | Wilkins et al. | |

* cited by examiner

Primary Examiner—Lynne H. Browne
Assistant Examiner—G M Collins
(74) Attorney, Agent, or Firm—Chernoff, Vilhauer, McClung & Stenzel, LLP

(57) ABSTRACT

A detachable and adjustable adapter assembly for directing fluid flow into and out of a dual cartridge media housing is disclosed.

11 Claims, 4 Drawing Sheets

FLUID CONNECTION ADAPTER ASSEMBLY

BACKGROUND OF THE INVENTION

The production of laboratory grade ultrapure water or other fluid reagents often requires contacting the fluid feed with various solid filtration and/or adsorption media to free the water from minute quantities of pollutants such as organic compounds, flocculants and charged particles. See, for example, U.S. Pat. Nos. 5,868,924 and 5,925,240. There is a need in the art for appropriately designed devices for containing such solid media to maximize efficient contact between the fluid and the media and for adapters for achieving efficient fluid flow into and out of such devices.

BRIEF SUMMARY OF THE INVENTION

The present invention comprises an adapter assembly for simple and secure fluid connections to a housing for containing purification media for the treatment of liquids.

DETAILED DESCRIPTION OF PREFERRED EMBODIMENT

Figure 1:
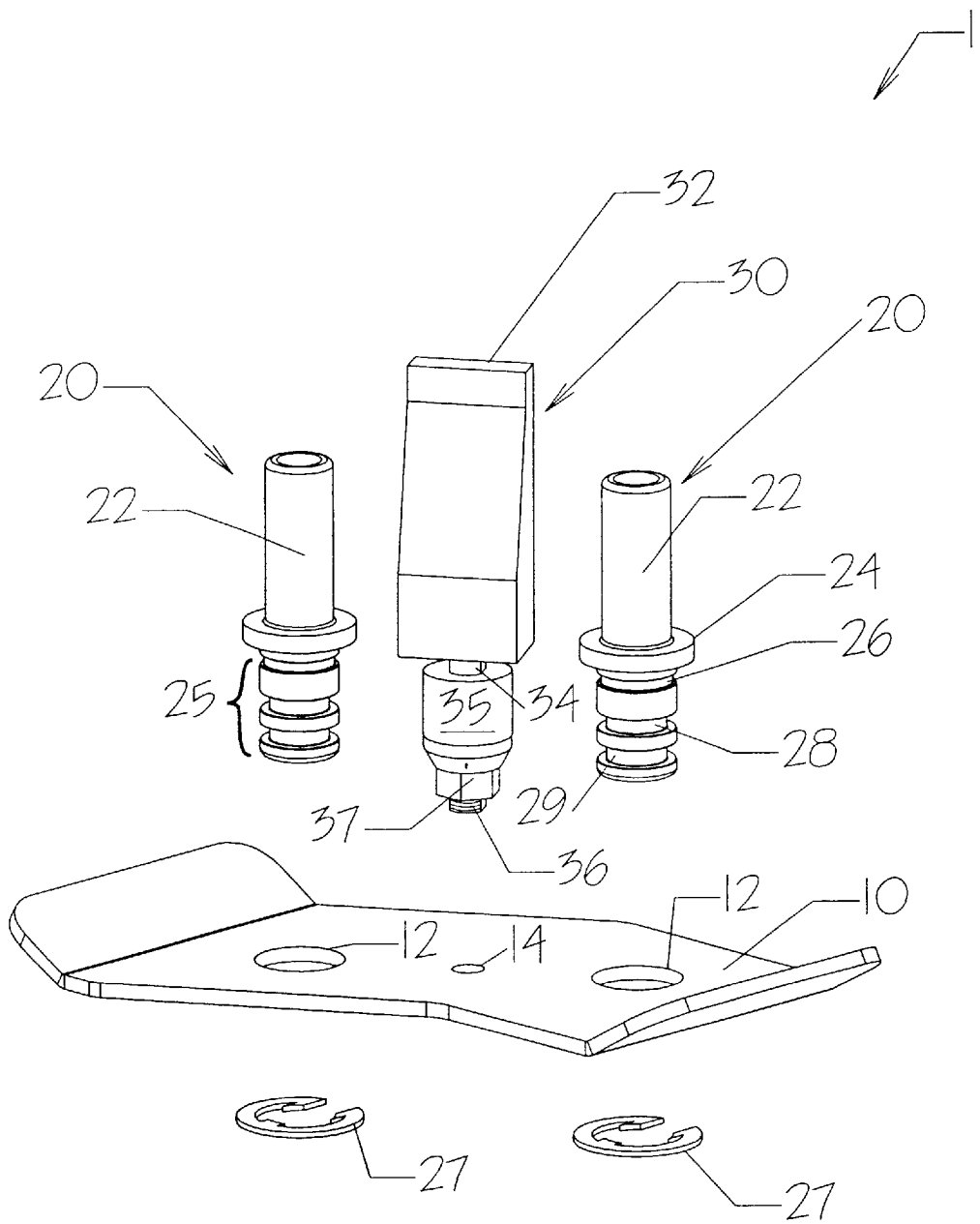
FIG. 1 is an exploded perspective view of an exemplary embodiment of the adapter assembly of the invention.
Figure 2:
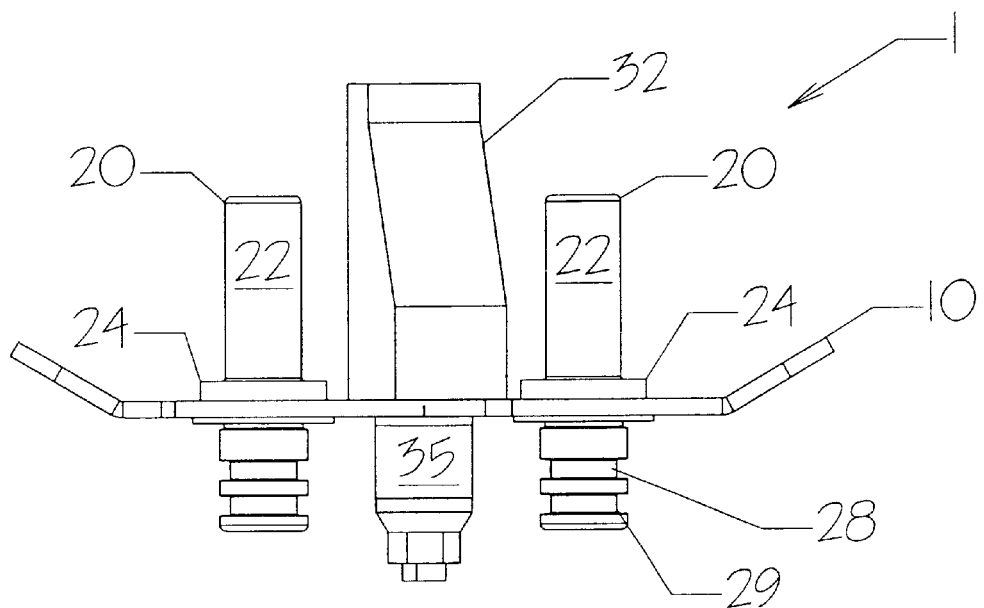
FIG. 2 is a side view of the assembly shown in FIG. 1 with its latching lever in open position.
Figure 3:
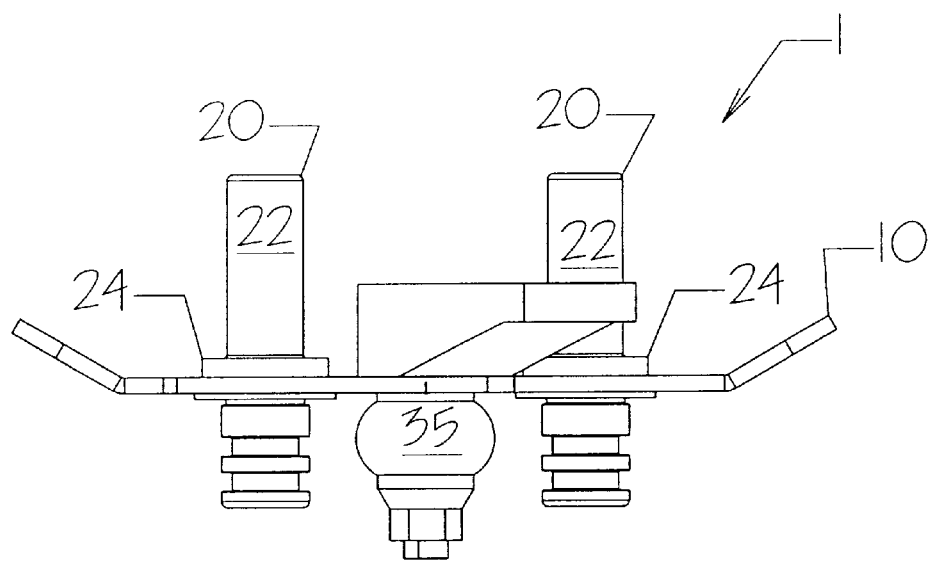
FIG. 3 is a side view of the assembly shown in FIG. 1 with its latching lever in closed position.
Figure 4:
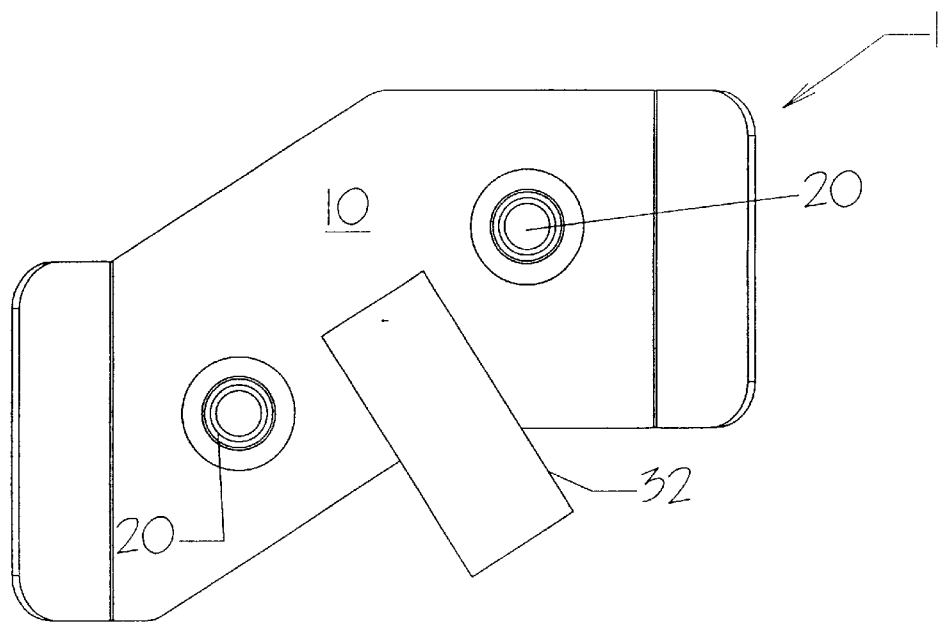
FIG. 4 is a plan view of the assembly shown in FIG. 2.

In the drawings there is shown in FIGS. 1–4 fluid connection adapter assembly 1 comprising mounting plate 10 having two bores 12 for receiving at least two fluid connector assemblies 20 and optional single bore 14 for receiving locking latch assembly 30. Each fluid connector assembly 20 comprises fluid coupling 22, flange 24 at the base of fluid coupling 22 for engaging mounting plate 10, hollow connecting shaft 25, e-clip groove 26, e-clip 27 and at least one O-ring groove 28, 29 to accommodate O-ring(s) (not shown). Locking latch assembly 30 comprises rocking arm lever 32 pivotally affixed to shaft 34 having grommet 35 mounted thereon, the shaft 34 having a threaded portion 36 to threadingly engage adjustment nut 37.

Figure 5:
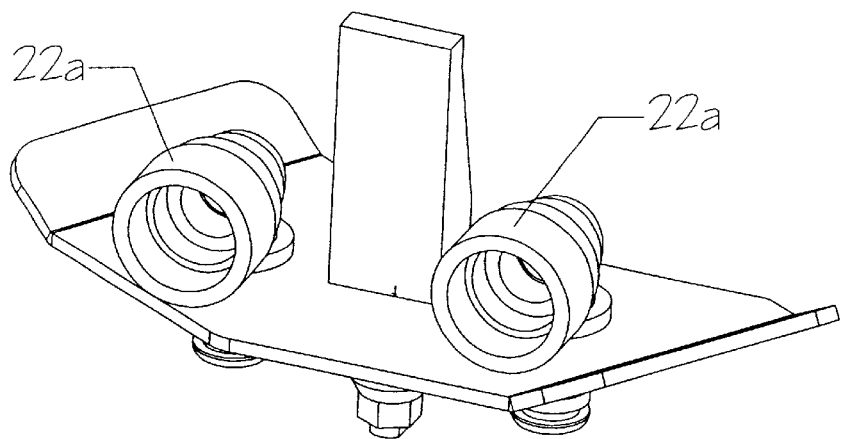
FIG. 5 is a perspective view of the assembly shown in FIG. 1 but with an alternative fluid coupling.

FIG. 5 shows the same fluid connection adapter assembly of FIGS. 1–4, but with alternative fluid couplings 22a, described below.

Figure 6:
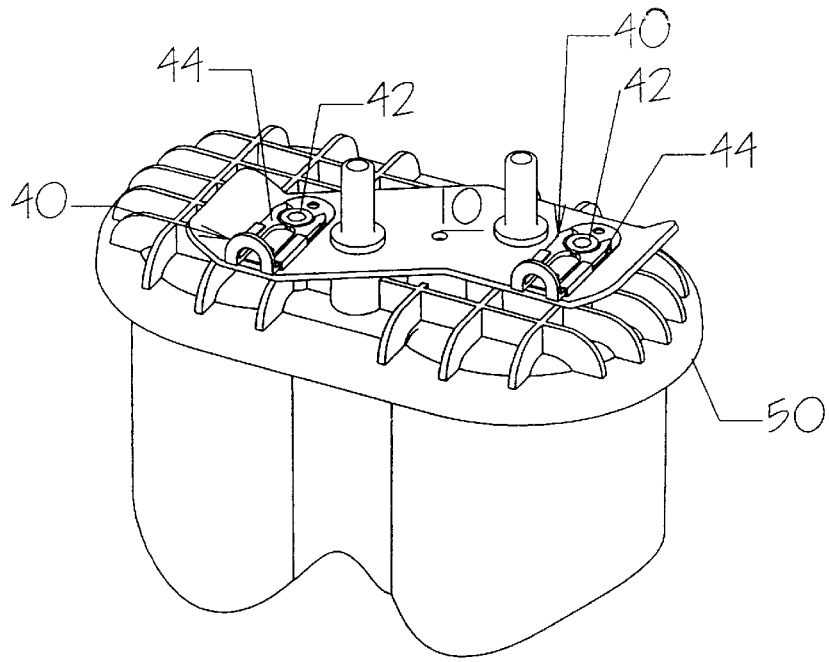
FIG. 6 is a perspective view of an alternative latching assembly shown attaching the adapter assembly to an exemplary fluid filtration cartridge.

FIG. 6 illustrates an alternative slide latch assembly 40 that may be used instead of the locking latch assembly 30, comprising at least two studs 42 secured through mounting plate 10 to an end cap 50 of a media housing (shown in cutaway) so as to engage at least two slide latches 44, such slide latches being commercially available as DZUS latches from Dzus Fastener Co. of West Islip, N.Y.

The device of the present invention provides secure fluid connection to both the inlet and the outlet of a dual cartridge media housing simultaneously and with a minimum of effort. The fluid connection device allows for quick and easy changing of disposable purification packs, which reduces downtime. The device further provides an adjustable fastener design, which enables the user to tighten the connection relative to wear or age of the device to ensure secure connection of fluid-carrying plumbing. Many options for the connection of tubing to the fluid connection adapter assembly are available for a wide variety of applications.

Although fluid couplings 22 may be in virtually any configuration they are preferably in the form of a short rigid tube that is straight or tapered, the opening of which is oriented upwardly for the connection of tubing or pipe. This provides essentially unlimited adaptation of tubing, pipe or other plumbing connections or joints or reducers to the fluid coupling. One can simply press fit tubing over the straight or tapered tube with or without a clamp or adapt any tube fitting, tee, elbow or compression fitting. Push-on fittings such as Parker or John Guest brands which utilize grab rings and O-rings are readily adaptable to the tube. Properly sized compression-type fittings may also be attached. In this manner, the adaptability of different sized tubing is only limited by available adapters/reducers. For example, utilizing a ⅜-inch straight tube adapter on the fluid connector 22, fittings of all of the following sizes may be used to accommodate tubing of various sizes: ¼-inch, ½-inch and ⅜-inch.

In another embodiment, an L-shaped fluid coupling may be used, shown as element 22a in FIG. 5. In both this embodiment and the straight tube embodiment the opening for receiving the plumbing may be designed and sized to receive a variety of diameters of couplings internally. This allows the insertion of grab rings and O-rings sized to fit the desired plumbing. The internal coupling parts are sized to fit the flange opening diameter, while the inside diameter of the grab ring/O-ring coupling can be changed to accommodate the desired tubing size.

Figure 7:
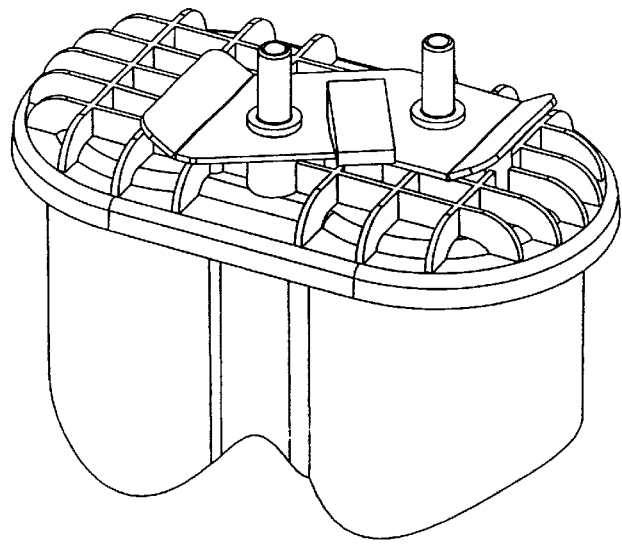
FIG. 7 is a perspective view of the assembly shown in FIG. 1 attached to the top portion of an exemplary fluid filtration cartridge.

In any case, fluid couplings 22/22a are part of, or attached to, fluid connector adapter assembly 1 which passes through the horizontal plane of mounting plate 10, which is designed to attach to the top of a dual cartridge media housing, shown in FIG. 7, and which forms the subject matter of copending U.S. application Ser. No. 09/733,770, filed Dec. 8, 2000, now U.S. Pat. No. 6,383,382 B1. Hollow connecting shaft 25 extends from the bottom of mounting plate 10 and is provided with grooves 26, 28, 29 to accommodate an e-clip and at least one O-ring, the O-ring(s) providing a fluid-tight seal within the female opening (not shown) of the media housing. O-rings may be constructed of virtually any elastomeric material, depending upon purity requirements, but are preferably constructed of vinylidene fluoride/hexafluoropropylene copolymers, commercially available as the Viton A family of polymers from DuPont.

Located in the center of mounting plate 10 is locking latch assembly 30, which is designed to securely fasten adapter assembly 1 to the media housing. Locking latch assembly 30 incorporates rocking arm lever 32 on top of mounting plate 10 and an elastomeric distortable grommet 35 under the mounting plate. Rocking arm lever 32 is mechanically and pivotally connected to shaft 34 that passes through the horizontal plane of mounting plate 10 and which is threaded on its lower end 36 to accommodate an adjustment nut 37 that is threaded onto the end of shaft 34. With the adapter assembly 1 fully seated into the media housing, rocking arm lever 32 is pivoted downwardly approximately 90° from the vertical plane, drawing shaft 34 upward and forcing adjustment nut 37 against grommet 35, which in turn causes grommet 35 to expand outwardly along its outer periphery to create a snug and secure attachment. The relative snugness of the attachment can be adjusted by threading adjustment nut 37 toward or away from grommet 35; such adjustment can compensate for dimensional variations in or wear of the mating parts. To release the adapter assembly 1 from the media housing, rocker arm lever 32 is simply pivoted upwardly through about 90° from the horizontal plane. In the case of the alternative slide latch assembly shown in FIG. 6, release is achieved simply by disengaging slide latches 44 from studs 42.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A fluid flow adapter assembly attachable fluid-tight to the inlet and outlet of a dual cartridge liquid purification media housing comprising:
   (a) a mounting plate;
   (b) bores in said mounting plate to accommodate two fluid connector assemblies;
   (c) two fluid connector assemblies, each comprising:
      (i) a fluid coupling;
      (ii) a flange at the base of said fluid coupling for engaging said mounting plate;
      (iii) a hollow connecting shaft with grooves to accommodate fastening means and at least one O-ring; and
   (d) latching means capable of simultaneously securing said adapter assembly to said housing and securing said two fluid connector assemblies fluid-tight to said inlet and said outlet of said housing.

2. The adapter assembly of claim 1 including at least one O-ring on said connecting shaft.

3. The adapter assembly of claim 1 wherein said fastening means of said connecting shaft is an e-clip.

4. The adapter assembly of claim 1 wherein said latching means comprises a locking latch assembly comprising a rocking arm lever pivotally affixed to a first end of a shaft having an elastomeric grommet and an adjustment nut mounted on a second end of said shaft that is distal to said first end, and wherein said mounting plate has bore through which said shaft passes, said latching means being capable of exerting a downward force on said mounting plate.

5. The adapter assembly of claim 1 wherein said latching means comprises at least two slide latches designed to slidingly engage at least two studs in said housing.

6. The adapter assembly of claim 1 wherein said fluid coupling of said two fluid connector assemblies is in the form of a tube.

7. The adapter assembly of claim 6 wherein said tube is a straight tube.

8. The adapter assembly of claim 7 wherein said straight tube has an opening with a variety of internal diameters.

9. The adapter assembly of claim 6 wherein said tube is a tapered tube.

10. The adapter assembly of claim 6 wherein said tube is an L-shaped tube.

11. The adapter assembly of claim 10 wherein said L-shaped tube has an opening with a variety of internal diameters.

* * * * *